United States Patent
Park et al.

(10) Patent No.: US 7,286,551 B2
(45) Date of Patent: Oct. 23, 2007

(54) MEDIA ACCESS CONTROL DEVICE GUARANTEEING COMMUNICATION QUALITY IN WIRELESS LAN FOR VOIP

(75) Inventors: Chan Won Park, Daejeon (KR); Jung Sik Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 209 days.

(21) Appl. No.: 11/122,941

(22) Filed: May 4, 2005

(65) Prior Publication Data

US 2006/0098626 A1 May 11, 2006

(30) Foreign Application Priority Data

Nov. 11, 2004 (KR) ............ 10-2004-0092093

(51) Int. Cl.
*H04L 12/28* (2006.01)
(52) U.S. Cl. .............. 370/412; 370/462; 370/230; 455/41.2
(58) Field of Classification Search ........... 370/445, 370/230.1, 412, 458, 462; 455/41.2
See application file for complete search history.

(56) References Cited

U.S. PATENT DOCUMENTS

| | | | |
|---|---|---|---|
| 6,560,196 B1 * | 5/2003 | Wei | 370/230.1 |
| 6,611,531 B1 * | 8/2003 | Chen et al. | 370/458 |
| 2004/0114619 A1 * | 6/2004 | Park et al. | 370/445 |
| 2004/0264488 A1 * | 12/2004 | Yoon et al. | 370/412 |
| 2005/0141544 A1 * | 6/2005 | Park et al. | 370/445 |
| 2005/0141548 A1 * | 6/2005 | Koo et al. | 370/462 |

OTHER PUBLICATIONS

IEEE Communications Society, pp. 3706-3711, Apr. 2004.
IEEE P802.11e/D8.0, Feb. 2004 (Draft Amendment to IEEE Std 802.11, 1999 Edition (Reaff 2003)).

* cited by examiner

*Primary Examiner*—Sanh D. Phu
(74) *Attorney, Agent, or Firm*—Blakely, Sokoloff, Taylor & Zafman

(57) ABSTRACT

A MAC device guarantees QoS in a VoIP wireless LAN by giving higher priority to voice data than to non-voice data. Transmission data generated by an application program is provided to a modem according to the priority assigned to the data. A kernel classifies the transmission data into voice and non-voice data. A MAC driver stores the voice and non-voice data in two queues, and transmits a MAC header to a MAC transmitter to notify it of generation of the transmission data, and transmits the stored voice or non-voice data to the MAC transmitter according to the type of a transmission interrupt received from the MAC transmitter in response to the notification. The MAC transmitter combines the voice or non-voice data, received from the MAC driver in response to the transmission interrupt, with a corresponding header, and outputs it to the modem.

10 Claims, 8 Drawing Sheets

| Priority (=802.1D pri) | 802.1D Designation | Designation | 802.11e AC (Access Category) |
|---|---|---|---|
| 1 | BK | best effort | 0 |
| 2 | - | best effort | 0 |
| 0 | BE | best effort | 0 |
| 3 | EE | Video probe | 1 |
| 4 | CL | Video | 2 |
| 5 | VI | Video | 2 |
| 6 | VO | Voice | 3 |
| 7 | NC | Voice | 3 |

| | 0 1 2 3 | 4 5 6 7 | 8 9 10 11 12 13 14 15 | 16 17 18 19 20 21 22 23 24 25 26 27 28 29 30 31 | |
|---|---|---|---|---|---|
| Version | | Header length | TOS | Length(by bytes) | |
| Identification | | | | Flags | Flagment offset |
| TTL | | | Protocol | Header checksum | |
| Source IP address | | | | | |
| Destination IP address | | | | | |

TOS field

| 8 9 10 | 11 12 13 14 | 15 |
|---|---|---|
| Precedence | TOS | 0 |

FIG. 8

| Parameter | CWmin | CWmax | AIFSN | TXOP limit |
|---|---|---|---|---|
| Voice | aCWmin_vo | aCWmax_vo | AIFSN_vo | TXOP_vo |
| Non-voice | aCWmin_nvo | aCWmax_nvo | AIFSN_nvo | TXOP_nvo |

FIG. 9

| | 31 | 16 | 0 |
|---|---|---|---|
| TxHeader1 | Duration/ID | | Frame control |
| TxHeader2 | Adress 1 (4byte~1byte) | | |
| TxHeader3 | Adress 2 (2byte~1byte) | | Adress 1 (6byte~5byte) |
| TxHeader4 | Adress 2 (6byte~3byte) | | |
| TxHeader5 | Adress 3 (4byte~1byte) | | |
| TxHeader6 | Sequens control | | Adress 3 (6byte~5byte) |
| TxHeader7 | Adress 4 (4byte~1byte) | | |
| TxHeader8 | QoS Control | | Adress 4 (6byte~5byte) |

FIG. 11

MEDIA ACCESS CONTROL DEVICE GUARANTEEING COMMUNICATION QUALITY IN WIRELESS LAN FOR VOIP

RELATED APPLICATIONS

The present application is based on, and claims priority from, Korean Application Number 2004-92093, filed Nov. 11, 2004, the disclosure of which is incorporated by reference herein in its entirety.

BACKGROUND OF THE INVENTION

1. Field of the Invention

The present invention relates to a media access control device guaranteeing Quality of Service (QoS) in a wireless LAN for Voice over IP (VoIP) that can guarantee communication quality of VoIP services provided in wireless LAN areas.

2. Description of the Related Art

Voice over IP (VoIP) is a technology for transferring voice information using an Internet Protocol (IP). This technology provides voice information services in digital form through discrete packets, rather than using a circuit-based protocol as in a Public Switched Telephone Network (PSTN). Attempts have been made to provide the VoIP service not only in wired networks but also in wireless networks. The key to implementation of the VoIP service is to guarantee Quality of Service (QoS) above a certain level with packets that are discretely transferred as described above.

Of various data such as voice, video and Internet data, real-time data including voice data must be processed earlier than other data (i.e., non-real-time data) in order to guarantee QoS in providing the VoIP service in a wireless LAN environment in which a plurality of stations 11 to 13 are connected to a single Access Point (AP) as shown in FIG. 1.

IEEE 802.11 standard uses Carrier Sense Multiple Access/Collision Avoidance (CSMA/CA) in the environment as shown in FIG. 1. A station is given an opportunity to access the medium according to Distributed Coordination Function (DCF) timing rules after waiting until the medium becomes idle. A backoff algorithm used in this technique employs a collision avoidance scheme to prevent transmission data from colliding with each other on a channel. A station having data to transmit monitors the channel. If the channel is busy or if it is busy after waiting a time interval corresponding to a DCF Inter-Frame Space (DIFS), the data is transmitted after performing backoff count for a time interval corresponding to a random Contention Window (CW) value generated by a random generator. The random CW value is randomly drawn from the range [0, CWrange] (i.e., the range of 0 to CWrange). The initial random CW value is drawn from the range [0, CWmin]. Each time transmission fails, CWrange is increased to "2(CWrange+1)−1" until it reaches the maximum CW "CWmax" stored in a CWmax register, in which the random CW value is drawn from the increased range.

If each station 11 to 13 fails to transmit a frame, it performs backoff in the above manner to retransmit the frame until the maximum number of times of retransmission is reached. If the next data to transmit is real-time data, transmission delay occurs since the next data cannot be transmitted until the previous data transmission is completed, which makes it difficult to guarantee QoS.

According to the IEEE 802.11e standard, which has been proposed for wireless LAN environments, data is classified into 8 types as shown in FIG. 2. 0th to 2nd priority is assigned to best effort data, 3rd priority is assigned to video probe data, 4th and 5th priority is assigned to video data, and 6th and 7th priority is assigned to voice data. The 8 data types are classified into four Access Categories (AC0 to AC3). As shown in FIG. 3, a Media Access Control (MAC) 30 according to the IEEE 802.11e standard includes four AC processors 31 to 34 for individually processing the four access categories (AC0 to AC3), and four backoff processors 35 to 38 connected respectively with the four AC processors 31 to 34. Each of the four AC processors 31 to 34 includes a single queue to transmit voice, video, or general data according to Enhanced Distributed Channel Access (EDCA) rules. As the priority of data increases, the range of CW values decreases, shortening its backoff time, so that the station more quickly gets the opportunity to transmit the data. Different Arbitration Inter-Frame Space Numbers (AIFSN) are assigned to the access categories, so that the access categories AC3, AC2, AC1 and AC0 are sequentially allocated slot times for starting transmission.

However, in the IEEE 802.11e standard, the processor load is increased to guarantee QoS for each data type, and memory or functional block size is also increased to implement the media access control unit. Although the above method can guarantee QoS for both the real-time and non-real-time data to achieve high quality communication, it is difficult to apply the method to portable devices such as VoIP phones that require small size and low power design, saving hardware resources.

SUMMARY OF THE INVENTION

Therefore, the present invention has been made in view of the above problems, and it is an object of the present invention to provide a Media Access Control (MAC) device that guarantees Quality of Service (QoS) using minimum resources in wireless LAN environments for VoIP by giving higher priority to transmission of voice than to transmission of non-voice data, thereby achieving effective data transmission according to the wireless LAN standard.

In accordance with the present invention, the above and other objects can be accomplished by the provision of a Media Access Control (MAC) device for guaranteeing Quality of Service (QoS) in a Voice over IP (VoIP) wireless LAN, wherein transmission data generated by an application program is provided to a modem according to priority assigned to the transmission data, the device comprising a kernel, a MAC driver, and a MAC transmitter, wherein the kernel classifies the transmission data received from the application program into voice data and non-voice data;

wherein, while performing wireless LAN data service management, the MAC driver stores the classified voice and non-voice data received from the kernel respectively in two queues, and transmits a MAC header to the MAC transmitter to notify the MAC transmitter of the generation of the transmission data, and then transmits the stored voice or non-voice data to the MAC transmitter according to the type of a transmission interrupt received from the MAC transmitter in response to the notification, and wherein the MAC transmitter determines, based on the MAC header received from the MAC driver, that the transmission data has been generated, independently operates a MAC protocol for voice data and for non-voice data with a higher priority given to voice data than to non-voice data, provides a transmission interrupt corresponding to a data type preferentially getting a medium access opportunity to the MAC driver, combines voice or non-voice data corresponding to the data type preferentially getting the medium access opportunity, received from the MAC driver in response to the transmission interrupt, with a corresponding header, and outputs the combined data to the modem.

BRIEF DESCRIPTION OF THE DRAWINGS

The above and other objects, features and other advantages of the present invention will be more clearly understood from the following detailed description taken in conjunction with the accompanying drawings, in which:

FIG. 8 is a diagram illustrating the structure of an IP header;

FIG. 9 is a table illustrating QoS parameters used in a MAC method according to the present invention;

FIG. 11 is a diagram illustrating the structure of a header register in the MAC device according to the present invention.

DESCRIPTION OF THE PREFERRED EMBODIMENTS

A basic concept of the present invention is first described below for better understanding of the present invention before the detailed description.

Figures 1, 2:
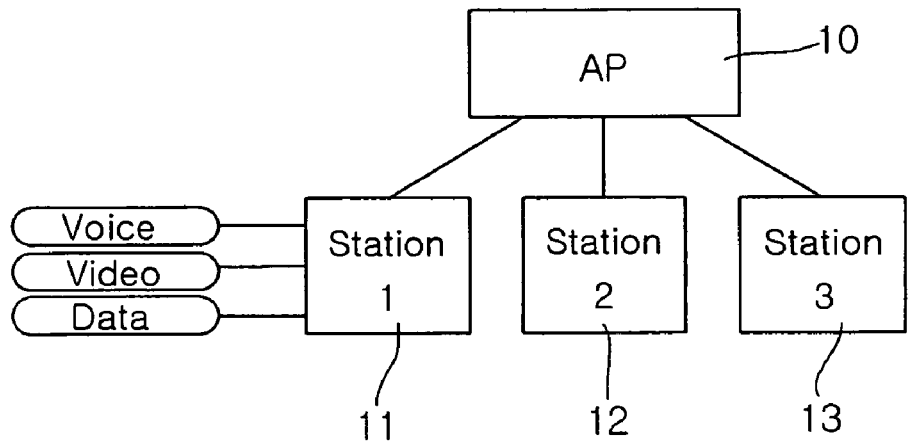
FIG. 1 is a schematic diagram illustrating a wireless LAN environment in which various data is provided.
FIG. 2 is a table illustrating Access Categories (AC) according to basic specifications proposed in IEEE 802.11e draft 8.0.
Figure 3:
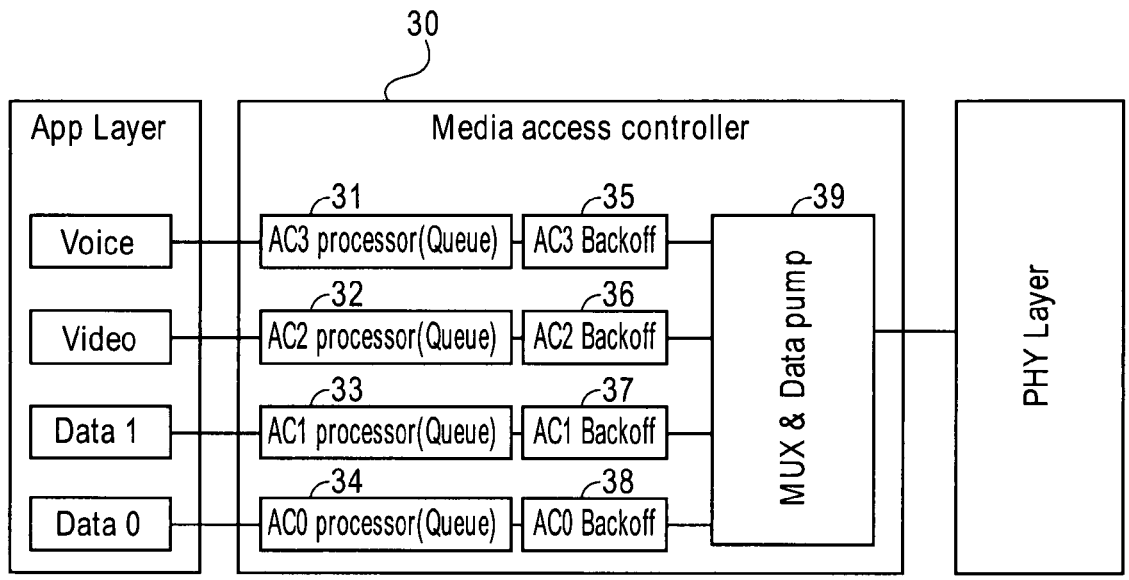
FIG. 3 is a block diagram of an example Media Access Control (MAC) device according to the IEEE 802.11e draft 8.0.
Figure 4:
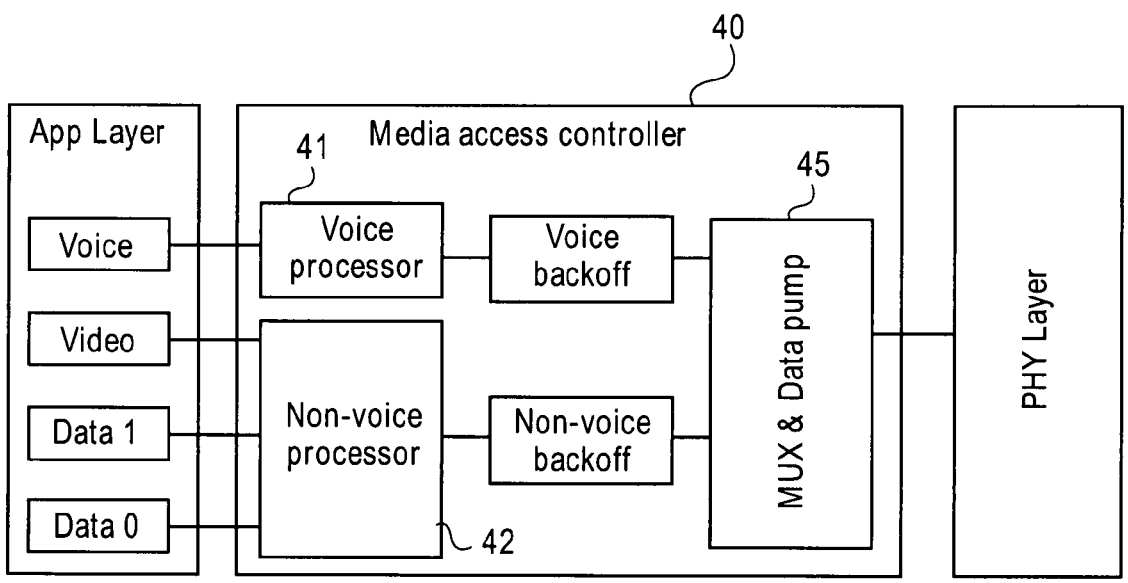
FIG. 4 is a block diagram of a transport layer that employs a MAC device according to the present invention.

FIG. 4 is a schematic diagram of a Media Access Control (MAC) device according to the present invention. In FIG. 4, the MAC device processes voice data with high priority in a voice processor 41, and processes the other data (i.e., non-voice data) with low priority in a non-voice processor 42, thereby minimizing the use of hardware resources. A MUX & data pump 45 selectively connects the voice processor 41 or the non-voice processor 42 to the physical layer to transfer corresponding transmission data (i.e., voice or non-voice data) to the physical layer.

If the MAC device is implemented as described above, the MAC device can guarantee QoS with a simple hardware structure including one First Input First Output (FIFO) and two header registers.

The configuration and operation of a MAC device according to the present invention will now be described in detail with reference to FIGS. 5 to 11.

Figure 5:
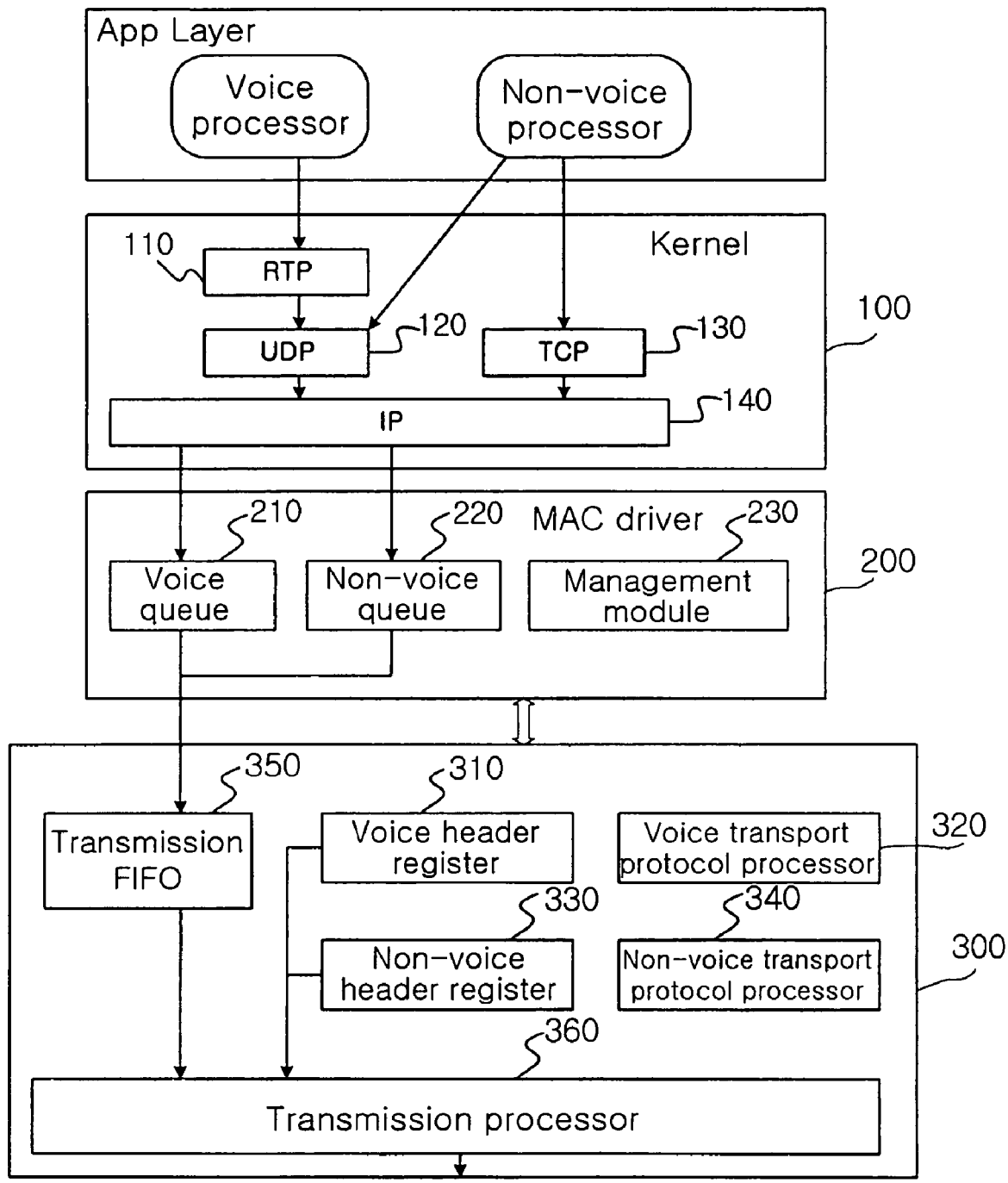
FIG. 5 is a block diagram of a MAC device according to the present invention.

FIG. 5 is a block diagram of a MAC device according to the present invention.

The MAC device according to the present invention includes a kernel 100, a MAC driver 200, and a MAC transmitter 300. The kernel 100 classifies transmission data generated in an application layer into voice data and non-voice data. While performing wireless LAN data service management, the MAC driver 200 stores the classified voice and non-voice data received from the kernel 100 respectively in two queues, and transmits a MAC data header to the MAC transmitter 300 to notify the MAC transmitter 300 of the generation of the transmission data, and then transmits the stored voice or non-voice data frame to the MAC transmitter 300 according to the type of a transmission interrupt received from the MAC transmitter 300 in response to the notification. If the MAC transmitter 300 determines, based on the MAC header received from the MAC driver 200, that the transmission data has been generated, the MAC transmitter 300 independently operates a MAC protocol for voice data and for non-voice data with a higher priority given to voice data than to non-voice data, provides a transmission interrupt corresponding to a data type preferentially getting a medium access opportunity to the MAC driver 200, combines voice or non-voice data corresponding to the data type preferentially getting the medium access opportunity, received from the MAC driver 200 in response to the transmission interrupt, with a corresponding header, and outputs the combined data to a modem.

FIG. 5 shows only a transmission portion of the MAC device, which is associated with the present invention.

The kernel 100 includes a Real-time Transport Protocol (RTP) 110, a User Datagram Protocol (UDP) 120, a Transmission Control Protocol (TCP) 130, and an Internet Protocol (IP) 140 to process transmission data generated in an application layer.

The RTP 110 is a transport layer communication protocol for transmitting and receiving real-time voice, video, or communication data. The transmitting side achieves playback synchronization based on time stamps and discards packets with a large delay. The receiving side checks transmission delay, bandwidth or the like, and reports the checked result to an application in the application layer above the transmitting side through an RTP Control Protocol (RTCP). The RTP 110 achieves QoS control by means of encoding speed control or the like.

The UDP 120 is a protocol based on TCP/IP, which is a set of standard Internet protocols. The UDP 120 is advantageous in that it enables high-speed protocol processing. Since the UDP 120 has no error correction or retransmission function, it is used in multimedia applications, which require high speed rather than reliability.

The TCP 130 is a protocol corresponding to the transport layer in the OSI basic reference model. The TCP 130 is combined with the IP 140 to constitute the TCP/IP. The TCP 130 performs arrangement of packets in the order in which they are received, error correction, or the like.

The IP 140 is a protocol corresponding to the network layer in the OSI basic reference model. The IP 140 is used in conjunction with the TCP 130 or the UDP 120. The IP 140 is a protocol for delivery of packets between different networks according to their IP addresses. That is, the IP 140 is a protocol for routing packets. The IP 140 enables data transmission between different networks but does not guarantees that packets will arrive in the order in which they are transmitted.

In TCP/IP, data is generally exchanged through a combination of the IP 140 and one of the TCP 130 and the UDP 120. When the TCP 130 is used, communication is initiated after establishing a session or connection. When the UDP 120 is used, data is transmitted to the destination address without establishing a session.

The MAC driver 200 includes a voice queue 210 for storing voice data classified by the kernel 100, a non-voice queue 220 for storing non-voice data of the data received from the kernel 100, and a management module 230 for performing wireless LAN data service management.

Figure 6:
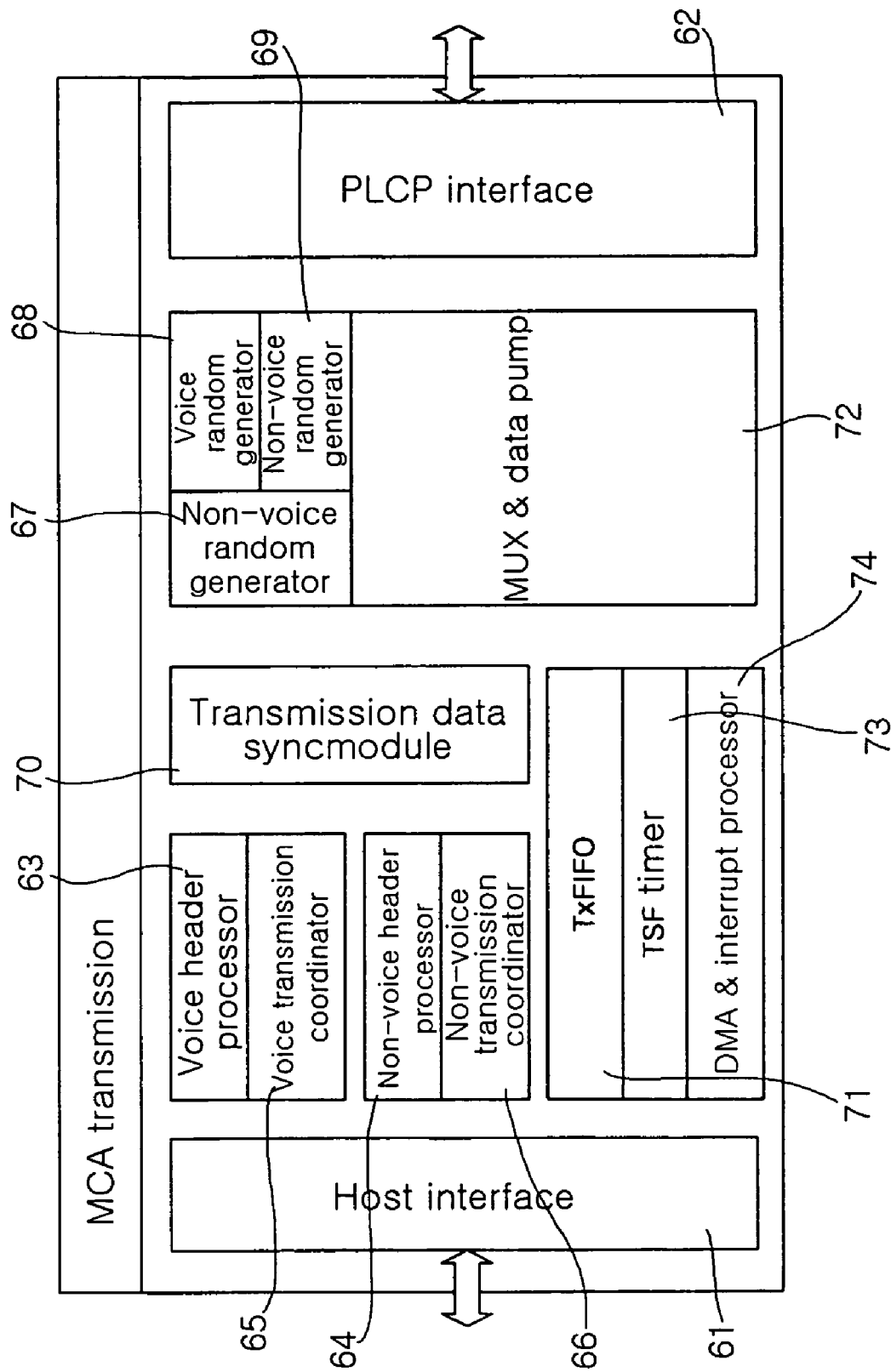
FIG. 6 is a block diagram of a hardware structure of a MAC transmitter in the MAC device according to the present invention.

The MAC transmitter 300 includes voice and non-voice header registers 310 and 330, voice and non-voice transport protocol processors 320 and 340, a transmission FIFO 350, and a transmission processor 360. The voice and non-voice header registers 310 and 330 store the respective MAC headers of voice and non-voice transmission data received from the MAC driver 200. The voice and non-voice transport protocol processors 320 and 340 seek an opportunity to access the medium for transmission of voice and non-voice transmission data received from the MAC driver 200 according to a priority scheme based on the type of the transmission data, and transfer a transmission interrupt, which requests transmission of a corresponding one of the voice and non-voice transmission data, to the MAC driver 200 when getting the medium access opportunity. The transmission FIFO 350 stores voice and non-voice data received from the MAC driver 200 according to the operation of the voice and non-voice transport protocol processor 320 and 340. The transmission processor 360 combines the data recorded in the transmission FIFO 350 with the headers recorded in the voice and non-voice header registers 310 and 320, and transmits the combined data. The MAC transmitter 300 is implemented in hardware form. FIG. 6 is a block diagram of an example hardware structure of the MAC transmitter 300.

As shown in FIG. 6, the hardware of the MAC transmitter 300 includes a host interface 61, which is an external interface connected with a processor, and a Physical Layer Convergence Protocol (PLCP) interface 62, which is connected with a modem for connection to a communication medium.

The voice header register 310 is included in the voice header processor 63, and the non-voice header register 330 is included in the non-voice header processor 64.

The voice and non-voice transmission coordinators 65 and 66 in FIG. 6 correspond to the voice and non-voice transport protocol processors 320 and 340 in FIG. 5.

The hardware of the MAC transmitter 300 further includes a backoff processor 67, a voice random generator 68, and a non-voice random generator 69. The backoff processor 67 supports a transport protocol of the voice and non-voice transmission coordinators 65 and 66 to perform backoff. The voice and non-voice random generators 68 and 69 generate backoff count values for voice and non-voice data, which are used as a basis for operating the backoff processor 67.

The hardware of the MAC transmitter 300 further includes a transmission data synchronization module 70. The transmission data synchronization module 70 has a function to transfer PLCP information of a transmission data frame, which includes a signal field, a header length, a data octet size, a PLCP Txservice, and a PLCP length/time, from one of the transmission coordinators 65 and 66, which has been assigned a channel, to the PLCP interface 62.

The hardware of the MAC transmitter 300 further includes a transmission FIFO 71, a MUX & data pump module 72, a Time Synchronization Function (TSF) timer 73, and a DMA & interrupt processor 74. The transmission FIFO 71 sequentially inputs and outputs transmission data frame bodies. The MUX & data pump module 72 serves as the transmission processor 360. The TSF timer 73 receives a beacon frame transmitted from an Access Point (AP) to achieve time synchronization. The DMA & interrupt processor 74 notifies the MAC driver 200 of the start of voice and non-voice transmission data, transmission success, and transmission failure.

Figure 7:
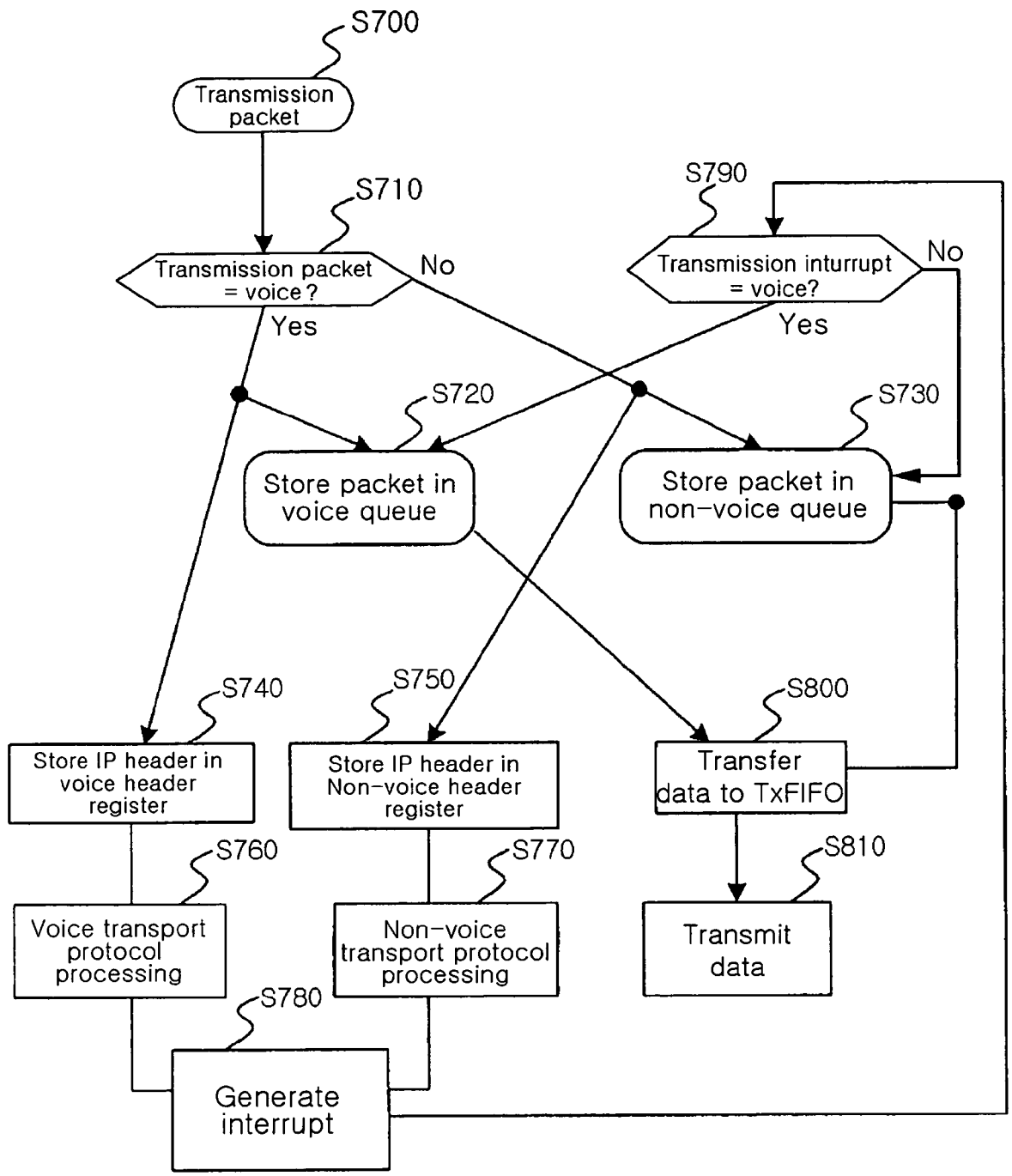
FIG. 7 is a signal flow diagram illustrating the procedure for data transmission in the MAC device according to the present invention.

FIG. 7 is a flow chart illustrating a media access control procedure performed in the MAC device configured as described above.

Figure 10:
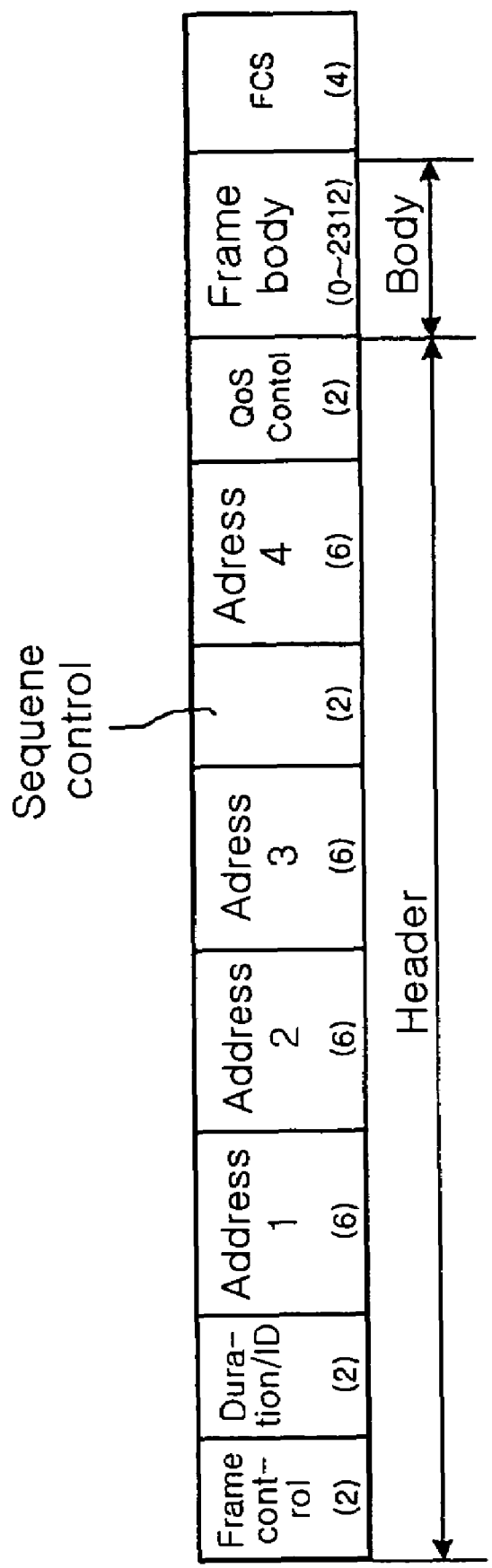
FIG. 10 is a diagram illustrating the format of a QoS frame according to the IEEE 802.11e draft 8.0.

FIG. 10 shows a wireless LAN QoS frame format according to the IEEE 802.11e standard used in the MAC device according to the present invention. A QoS control field is added to the IEEE 802.11 frame format, and the header length is 32 bytes.

FIG. 11 shows a detailed structure of the voice and non-voice header registers 310 and 330. The voice and non-voice header registers 310 and 330 separately store headers of QoS frames configured as shown in FIG. 10. Each of the voice and non-voice header registers 310 and 330 is configured to store duration/ID information, frame control information, first address information, second address information, third address information, sequence control information, forth address information, and QoS control information as header information, and output the header information in the named order.

The operation of the MAC device configured as described above will now be described with reference to FIG. 7.

If data for transmission generated in the application layer is transferred from the application layer to the MAC device, the data for transmission is first provided to the kernel 100.

In the kernel 100, voice data for transmission generated in the application layer is transferred to the IP 140 via the RTP 110 and the UDP 120, and non-voice data for transmission generated therein is transferred to the IP 140 via the UDP 120 or the TCP 130.

A voice data application program in the application layer, which has generated voice data, commands the IP 140 to write a predetermined value (for example, 1F) in a Type of Service (TOS) field of an IP header of the voice data as shown in FIG. 8. The TOS value of an IP header constructed in the IP 140 of the kernel 100 is the predetermined value "1F" for voice data, and is a different value for non-voice data.

As shown in FIG. 8, the IP header includes protocol information, a fragment offset, a Time To Live (TTL), a source IP address, a destination IP address, and header checksum information for transmission error check. A priority value and the type of service are written in the TOS field. In the present invention, the TOS field value is used to discriminate between voice and non-voice data.

If the IP 140 receives the transmission data, the IP 140 sends the transmission data to the MAC driver 200 while exchanging state information of the voice and non-voice queues 210 and 220 with the MAC driver 200. When providing a command to transfer the data to the MAC driver 200, the IP 140 determines whether the transmission data is voice or non-voice data, based on the TOS field value (for example, the predetermined value "1F") of the IP header, and sends a parameter Txdata_type according to the determination, which indicates whether the transmission data is voice or non-voice data, together with the transmission data, to the MAC driver 200. The MAC driver 200 can identify the type of the transmission data based on the value of the parameter Txdata_type.

The MAC driver 200 receives the parameter Txdata_type and the transmission data simultaneously from the IP 140. The MAC driver 200 discriminates between voice and non-voice transmission data based on the parameter Txdata_type, and stores the voice data in the voice queue 210 (S720), and stores the non-voice data in the non-voice queue 220 (S730).

At the same time, according to the parameter Txdata_type, the MAC driver 200 records the MAC frame header of the voice data in the voice header register 310 of the MAC transmitter 300 to inform the MAC transmitter 300 of the presence of the voice data (S740), and records the MAC frame header of the non-voice data in the non-voice header register 330 thereof to inform the MAC transmitter 300 of the presence of the non-voice data (S750).

In addition to the above processing of the transmission data, the MAC driver 200 performs data service management such as association and scanning among wireless LAN functions through the management module 230.

If the MAC driver 200 records a MAC frame header in the voice or non-voice header register 310 or 330, the MAC transmitter 300 determines that data for transmission is present, and selectively operates the voice or non-voice transport protocol processor 320 or 340 according to the type of the transmission data to provide the processor 320 or 340 with a medium access opportunity. Specifically, the MAC transmitter 300 operates the voice transport protocol processor 320 to provide it with a medium access opportunity if the transmission data is voice data (S760), and operates the non-voice transport protocol processor 340 to provide it with a medium access opportunity if the transmission data is non-voice data (S770).

Each of the two transport protocol processors 320 and 340 performs backoff, Enhanced Distributed Channel Access (EDCA), data retransmission, etc., according to the IEEE 802.11 rules. When getting a medium access opportunity, each of the two transport protocol processors 320 and 340 generates and provides a transmission interrupt to the MAC driver 200 so that the MAC driver 200 transfers transmission data corresponding to the type of the transmission interrupt to the transmission FIFO 350. Specifically, when receiving the transmission interrupt, the MAC driver 200 determines the type of the transmission interrupt, and records a MAC frame body of transmission data corresponding to the determined interrupt type in the transmission FIFO 350 of the MAC transmitter 300 (S780 to S800). More specifically, if the transmission interrupt is generated by the voice transport protocol processor 320, the MAC driver 200 transfers data in the voice queue 210 to the transmission FIFO 350. If the transmission interrupt is generated by the non-voice transport protocol processor 340, the MAC driver 200 transfers data in the non-voice queue 220 to the transmission FIFO 350.

From the moment each of the transmission protocol processors 320 and 340 gets a medium access opportunity, the transmission processor 360 in the MAC transmitter 300 multiplexes a frame header in a corresponding header register 310 or 330 and a data frame stored in the transmission FIFO 350, and starts sequential transmission (S810). To accomplish such transmission, the voice or non-voice transport protocol processor 320 or 340 performs media access control using QoS parameters as shown in FIG. 9 to guarantee QoS.

The present invention uses QoS parameters as shown in FIG. 9 to perform QoS processing. The QoS parameters include minimum and maximum contention window values "CWmin" and "CWmax", an Arbitration Inter-Frame Space-Number "AIFSN", which determines a transmission slot time, and the maximum transmission opportunity duration "TXOP limit". These four parameters are defined for each of voice and non-voice. Specifically, the voice transport protocol processor 320 uses parameters for voice aCWmin_vo, aCWmax_vo, AIFSN_vo, and TXOP_vo as shown in FIG. 9, and the non-voice transport protocol processor 340 uses parameters for non-voice aCWmin_nvo, aCWmax_nvo, AIFSN_nvo, and TXOP_nvo as shown in FIG. 9 in order to perform backoff, in which a typical backoff algorithm according to the IEEE 802.11e standard is used.

According to the IEEE 802.11e standard, the respective values of the voice QoS parameters "CWmin" and "CWmax" are set lower than the respective values of the non-voice QoS parameters "CWmin" and "CWmax" by a value in the range of (CWmin+1)/2−1 to (CWmin+1)/4−1. The MAC driver 200 can change this parameter setting at any time.

The respective values of the voice QoS parameters "AIFSN_vo" and "TXOP limit_vo" and the respective values of the non-voice QoS parameters "AIFSN_vo" and "TXOP limit_vo" are set in the same manner so that voice data transmission is assigned a channel earlier than non-voice data transmission. The MAC driver 200 can change this parameter setting at any time.

As apparent from the above description, the present invention provides a Media Access Control (MAC) device guaranteeing Quality of Service (QoS) in a wireless LAN for Voice over IP (VoIP). The MAC device can guarantee QoS for both real-time data such as voice data and non-real-time data such as non-voice data, while complying with EDCA rules recommended in IEEE 802.11e, thereby achieving high quality communication. The MAC device is implemented with a simple hardware structure, enabling small size and low power design, so that the MAC device can be applied to portable devices such as VoIP phones.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A Media Access Control (MAC) device for guaranteeing Quality of Service (QoS) in a Voice over IP (VoIP) wireless LAN, wherein transmission data generated by an application program is provided to a modem according to priority assigned to the transmission data, the device comprising a kernel, a MAC driver, and a MAC transmitter, wherein the kernel classifies the transmission data received from the application program into voice data and non-voice data; wherein, while performing wireless LAN data service management, the MAC driver stores the classified voice and non-voice data received from the kernel respectively in two queues, and transmits a MAC header to the MAC transmitter to notify the MAC transmitter of the generation of the transmission data, and then transmits the stored voice or non-voice data to the MAC transmitter according to the type of a transmission interrupt received from the MAC transmitter in response to the notification, and wherein the MAC transmitter determines, based on the MAC header received from the MAC driver, that the transmission data has been generated, independently operates a MAC protocol for voice data and for non-voice data with a higher priority given to voice data than to non-voice data, provides a transmission interrupt corresponding to a data type preferentially getting a medium access opportunity to the MAC driver, combines voice or non-voice data corresponding to the data type preferentially getting the medium access opportunity, received from the MAC driver in response to the transmission interrupt, with a corresponding header, and outputs the combined data to the modem.

2. The device according to claim 1, wherein the kernel comprises:
   a Real-time Transport Protocol (RTP) supporting real-time voice transmission and communication;
   a User Datagram Protocol (UDP) supporting high-speed data transmission;
   a Transmission Control Protocol (TCP) corresponding to a transport layer and supporting error correction and retransmission; and
   an Internet Protocol (IP) controlling transmission of packets between different networks according to IP addresses, wherein voice data is transferred to the IP via both the RTP and the UDP, and non-voice data is transferred to the IP via the UDP or the TCP.

3. The device according to claim 1, wherein the MAC driver comprises:
   a voice queue, as one of the two queues, for storing voice data classified by the kernel;
   a non-voice queue, as the other of the two queues, for storing non-voice data classified by the kernel; and
   a management module for performing wireless LAN data service management.

4. The device according to claim 1, wherein the MAC transmitter comprises:
   voice and non-voice header registers for storing respective MAC data frame headers of voice and non-voice transmission data received from the MAC driver;
   voice and non-voice transport protocol processors for seeking a medium access opportunity for transmission of voice and non-voice transmission data received from the MAC driver according to a priority scheme based on the type of the transmission data if respective MAC data frame headers of the voice and non-voice transmission data are stored in the voice and non-voice header registers, and transferring a transmission interrupt to the MAC driver when getting the medium access opportunity, the transmission interrupt requesting transmission of a corresponding one of the voice and non-voice transmission data;
   a transmission FIFO for storing voice and non-voice data received from the MAC driver according to an order in which the transmission interrupt is transferred to the MAC driver, and outputting the data in an order in which the data is input to the transmission FIFO; and
   a transmission processor for combining a data frame output from the transmission FIFO with header information recorded in the voice and non-voice header registers, and transmitting the combined data frame.

5. The device according to claim 2, wherein if the application program generates voice data, the application program commands the IP to write a predetermined value in a Type of Service (TOS) field of an IP header of the voice data, and the IP discriminates between voice and non-voice data based on a value of the TOS field.

6. The device according to claim 2, wherein, when commanding the MAC driver to transfer transmission data, the IP in the kernel sends a parameter indicating the type of the transmission data, together with the transmission data, to the MAC driver, thereby enabling the MAC driver to determine whether the transmission data is voice or non-voice data.

7. The device according to claim 4, wherein the voice and non-voice transport protocol processors perform backoff, Enhanced Distributed Channel Access (EDCA), and retransmission according to IEEE 802.11 rules.

8. The device according to claim 4, wherein, in order to get a medium access opportunity, the voice and non-voice transport protocol processors use voice and non-voice QoS parameters including minimum and maximum contention window values, an Arbitration Inter-Frame Space Number (AIFSN) determining a transmission slot time, and a maximum transmission opportunity duration (TXOP limit),
   wherein the voice QoS parameters and the non-voice QoS parameters are set to give a higher priority to transmission of voice data than to transmission of non-voice data.

9. The device according to claim 4, wherein each of the voice and non-voice header registers is configured to store duration/ID information, frame control information, first address information, second address information, third address information, sequence control information, forth address information, and QoS control information as header information, and output the header information in the named order.

10. The device according to claim 4, wherein the MAC transmitter is implemented in hardware comprising:
   a host interface connected with a processor in an application layer;
   a Physical Layer Convergence Protocol (PLCP) interface connected with the modem;
   a voice header processor including the voice header register, the voice header processor processing headers of voice transmission data;
   a non-voice header processor including the non-voice header register, the non-voice header processor processing headers of non-voice transmission data;
   voice and non-voice transmission coordinators serving respectively as the voice and non-voice transport protocol processors;
   a backoff processor supporting a transport protocol of the voice and non-voice transmission coordinators to perform backoff;
   voice and non-voice random generators for generating backoff count values for voice and non-voice data, respectively, the backoff count values being used as a basis for operating the backoff processor;
   a transmission data synchronization module for transferring PLCP information of a transmission data frame, the PLCP information including a signal field, a header length, data octet size, PLCP transmission service information, and PLCP length/time information, from one of the voice and transmission coordinators, the one coordinator having being given a medium access opportunity, to the PLCP interface;
   a transmission FIFO for sequentially inputting and outputting transmission data frame bodies;
   a MUX & data pump module serving as the transmission processor; and
   a Time Synchronization Function (TSF) timer for receiving a beacon frame transmitted from an Access Point (AP) to achieve time synchronization; and
   a DMA & interrupt processor for notifying the MAC driver of start of voice and non-voice transmission data, transmission success, and transmission failure.

* * * * *